United States Patent [19]

Yang

[11] Patent Number: 4,993,138
[45] Date of Patent: Feb. 19, 1991

[54] TOOL MILLING MACHINE OR THE LIKE TYPE COMPLEX PROCESSING MACHINE

[76] Inventor: Tai-Her Yang, 5-1 Taipin St., Si-Hu Town, Dzan-Hwa, Taiwan

[21] Appl. No.: 376,991

[22] Filed: Jul. 7, 1989

[51] Int. Cl.⁵ .......................... B23C 7/00; B23Q 37/00
[52] U.S. Cl. .......................................... 29/560; 29/57;
  409/144; 409/236
[58] Field of Search .................... 29/560, 57, 26 A;
  409/71, 236, 230, 144

[56] References Cited

U.S. PATENT DOCUMENTS

| | | | |
|---|---|---|---|
| 1,972,828 | 9/1934 | Nenninger | 409/236 |
| 2,175,592 | 10/1939 | Bennett | 409/236 X |
| 2,218,469 | 10/1940 | Hassman | 409/236 |

FOREIGN PATENT DOCUMENTS

| | | | |
|---|---|---|---|
| 793209 | 4/1958 | United Kingdom | 409/71 |
| 1266910 | 3/1972 | United Kingdom | 409/236 |

Primary Examiner—Z. R. Bilinsky
Attorney, Agent, or Firm—Leonard Bloom

[57] ABSTRACT

A milling machine of the type having a horizontal milling attachment unit including an arbor and an overarm that is horizontally disposed on the machine body. The improvement includes respective guideways found in apparatus sides of the overarm. A vertical milling attachment units is disposed in and carried by each respective guideway for horizontal movement of the vertical unit. A vertical milling attachment is vertically movable in the vertical unit. In this fashion, the vertical milling attachment unit and the vertical milling attachment may be moved independently of one another.

1 Claim, 1 Drawing Sheet

TOOL MILLING MACHINE OR THE LIKE TYPE COMPLEX PROCESSING MACHINE

BACKGROUND OF THE INVENTION

Conventional multi-functional tool milling machines often include overarm (a cutter) to support an arbor (a horizontal mill cutter rod), a vertical milling attachment (spindle arm unit) with independent power, that is located in the front end of the overarm (cutter arm spindle), and a (cutter rod support arm) that is attached to the machine body. This, for practical applications, it may only allow to select either vertical or horizontal processing but not both types of processing for continuous processing. Besides, to select the horizontal process, a user is required to dismount the vertical milling attachment (spindle head unit) and therefore it is not convenient for operation. The improvement according to present invention relates to forming a guideway (guide rail) on one side or both sides of a horizontal overarm (cutter rod arm) to couple with a vertical milling attachment unit (vertical cutter spindle head unit) including a keyslotter and a milling attachment (including, for example, milling, boring, drilling, tapping, inserting, grinding spindle head unit) with independent power and enable the vertical milling attachment unit (vertical cutter spindle head unit) including a keyslotter and a milling attachment to shift to and fro for processing and rear locating storage. Thus, when the milling machine is engaged in processing the workpiece horizontally or vertically, the machine body can be easily adjusted to be suitable for processing and further be suitable to continue proceeding in vertical/horizontal process works.

SUMMARY OF THE INVENTION

Present invention relates to an improvement for a tool milling machine or the like type of complex processing machines, its features lie in: guideways (guide rails) located along both sides or one side of a milling attachment unit (vertical cutter spindle head unit) including a keyslotter and a milling attachment an overarm (cutter rod arm) on the top of machine body, which is provided for driving vertical cutter spindle head unit with independent power to move forward or backward, so that the vertical milling attachment unit (vertical spindle head unit) can be driven to be engaged in vertical processing or to be stored on both sides of machine body and which will not impede horizontal spindle processing.

DETAILED DESCRIPTION OF THE INVENTION

Tool milling machines have played a very important role in mechanical processing. A vertical milling machine is commonly used for plane milling or drilling, boring, or lateral end face milling a horizontal milling machine is used for milling the chute or milling polyfaces with different heights by cutter having varied diameters and further has processing functions such as internal hold key etc., being equipped inserting out head, to fit for various utilities and to reduce the cost. As shown in Attachment 1, a dual-purpose vertical/horizontal milling machine, through changing the milling attachment (spindle head unit) with different functions, allows selection of one of the functions. However, changing the milling tools (cut head) of the milling attachment (spindle head unit) not only costs great deal of time but also the milling attachment (spindle head unit) is not easy for storage.

Figure 1:
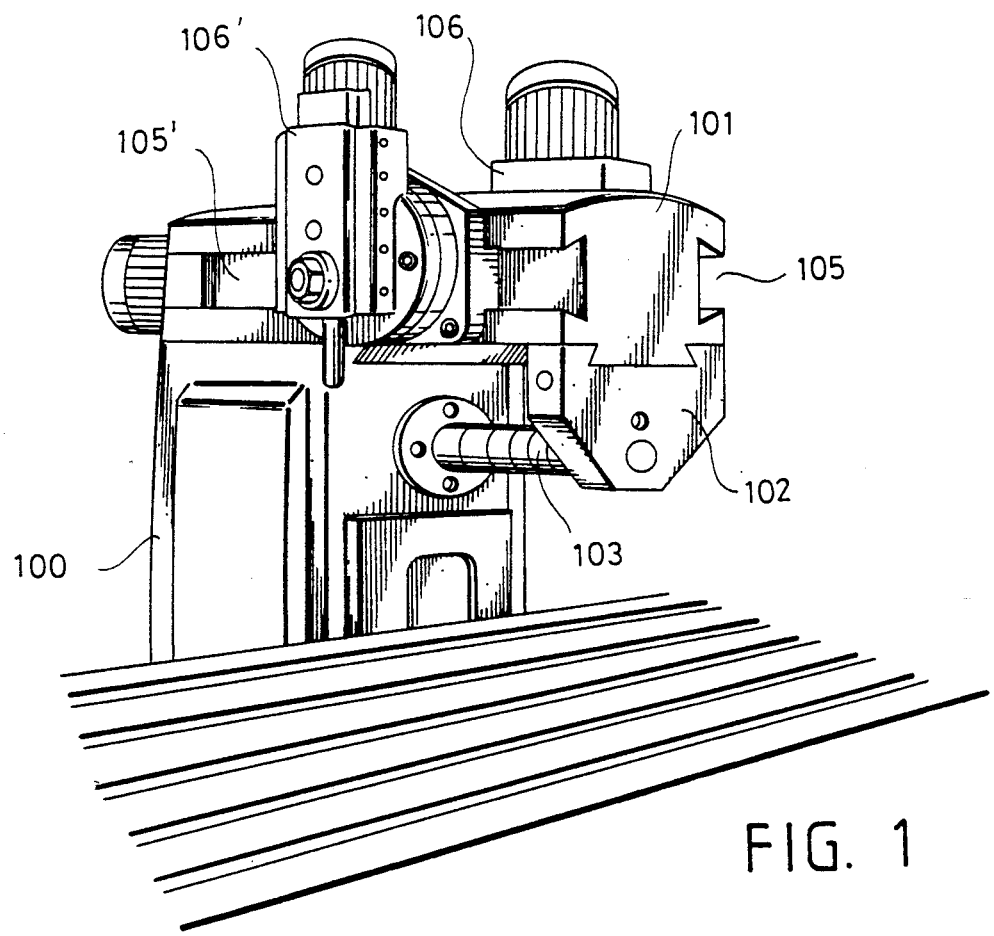
FIG. 1 is a diagrammatic view of the embodiment showing a dual-purpose milling machine having vertical spindle head unit being located on lateral side, which is able to do vertical shifting according to present invention.
Figure 2:
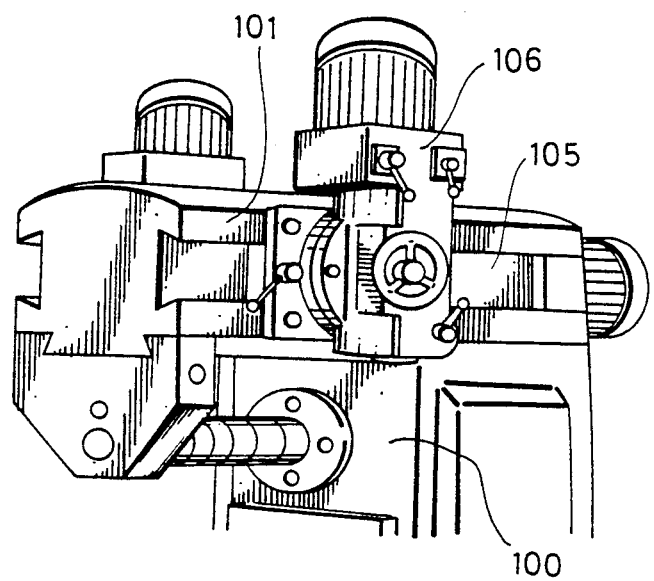
FIG. 2 is a diagrammatic view of the embodiment showing milling machine as shown in FIG. 1 has vertical spindle head unit being located on another side according to present invention.

The improvement according to the present invention relates to a new arrangement for the basic structure of a vertical and horizontal dual-purpose milling machine, and particularly to locate guideways (guide rails) on one side or both sides of an overarm (a cutter arm) that is horizontally disposed on the top of the machine body, which are provided for coupling with different milling attachment units (spindle head unit) having independent power in order to obtain vertical and horizontal movement thereof. It not only enables vertical and horizontal movement of the milling tool (cutting head) of the dual-purpose milling machine further to have various types of milling attachment units (spindle head units) but also further drives the vertical milling attachment unit (vertical spindle head unit) without the necessity for dismounting, so that the machine is able to be engaged in vertical and horizontal continuous production. The major idea according to present invention as shown in FIGS. 1 and 2 is a dual-purpose milling machine having at least one vertically movable milling attachment unit (vertical side spindle head unit) including a keyslotter and a milling attachment with is able to be engaged in longitudinal shifting (movement), wherein, the top (upper portion) of a horizontal milling machine embodiment 100 has an overarm (cutter rod arm) arm 101 which is adjustable (movable) from the front to the back, being provided for locating an arbor support (a cutter rod support seat) 102 to support an arbor (horizontal milling cutter rod) 103 and horizontal cutter (milling cutter) is engaged in horizontal milling process. Its major features lie in, at least one side (including top side or both sides) of the overarm (cutter rod arm) 101 has one of the respective guideways (slide rails) 105 and 105' (trackways) formed therein, each coupling with a respective vertical milling attachment unit (vertical spindle head unit) including a milling attachment 106 and a keyslotter 106' having independent power (drive means), such as a guide screw (or the other linear shifting mechanic or fluid elements) that is driven by motor or manpower to shift forward and backward for adjusting the positions or cut-in or locking on guideway (guide rail) along the length of the overarm (cutter rod arm) 101. The vertical milling attachment (cutter shaft) or horizontal cutter (milling cutter) is movable to a non-interference location to obtain the following advantages: guideways (guide rails) being located on the side (including both sides) of the overarm (arm) are provided for non-dismounting type selection (horizontal movement) of the vertical milling attachment unit (spindle head unit) as well as for storing the vertical milling attachment unit (spindle head unit) on a lateral face of the machine body;

It can combine digital electric control to make selection and shifting and feed quantity control for the vertical milling attachment unit (spindle head unit);

Continuous processing the workpiece including:

(1) Drilling or boring and later inserting for workpieces after finishing by horizontal milling machine.
(2) Plane processing for the top of workpieces whose later face having been processed by horizontal milling machine.
(3) Plane or deep slot milling by longitudinal (back and forth) feeding for the workpieces whose lateral face having been processed by horizontal milling machine.
(4) Mixing application for the other type of process.

For utility, its design same as traditional vertical spindle head tool machine includes:

the vertical milling attachment unit (spindle head unit) can be a vertical structure or adjustable oblique angle;

the vertical milling attachment unit (spindle head unit) has an independent feed function;

Affixed digital control system, automatic cutter replacement and relevant mechanism to automatic exchange working table system and electric control system and servo drive and measurement detection elements;

Affixed digital control system including selection of two lateral milling attachment units (spindle head units) and drive command and relevant electric control and servo drive and measurement detection elements.

To conclude the above-mentioned descriptions, the structure according to present invention covers the features as below:

Machine embodiment (body) has horizontal spindle head unit including a cutter rod arm horizontally slidably movable back (rearward) and forth (forward) (including power drive) and under the overarm (arm) there is a spindle (slide rails groove) formed below the arm for coupling an arbor having a horizontal milling cutter; guideways (slide rails) being located on one side or both sides of the overarm, are provided for coupling the vertical milling attachment units (motor spindle head unit) with independent drive power for milling or boring or drilling or tapping or inserting or grinding etc.;

the guideways (slide rails groove) being located on lateral face of the overarm (arm) is provided for the aforesaid vertical milling attachment units (cutter head) storing on both sides of machine body but not interfering X axial work space of working table;

Position adjustment from back to forth or feed between the milling attachments (spindle cutting head) and the overarm (arm) can be driven by independent motor or fluid elements;

The aforesaid independent milling attachments (drive spindle head unit) can be driven from back to forth by spindle motor; or if constant adjustment is not necessary, sliding position and locking between milling attachment units (spindle head unit) and horizontal overarm (cutter rod arm) of the aforesaid independent horizontal milling attachment (drive spindle head unit) can be pushed by manpower for direct coupling and no additional drive elements shall be located;

Working table of machine body can be fixed to move along X axis from the right to the left or to move along X axis from the right to the left plus Z axis moving back and forth, or further a mechanism movable along X axis from right to left, Y axis from back to forth and Z axis up and down;

Affixed digital control system, automatic cutter replacement system and relevant mechanism to automatic exchange working table and electric control and servo drive and measurement detection elements;

Affixed digital control system including selection of two lateral vertical milling attachment units (spindle head unit) and drive command and relevant electric control and servo drive and measurement detection elements.

I claim:

1. In a milling machine of the type having a machine body including an upper portion a horizontal milling attachment unit including a horizontal arbor and an overarm having a length, the overarm being horizontally disposed on the upper portion of the machine body, the improvement thereupon comprised of:

the overarm having respective guideways formed in opposite sides thereof extending along at least a portion of the length of the overarm;

a vertical milling attachment unit disposed in and carried by each respective guideway of the overarm for horizontal movement of the vertical unit in opposite forward and backward directions along the length of the overarm; and a vertical milling attachment for vertical movement of the vertical milling attachment in the vertical milling attachment unit in opposite upward and downward directions, such that horizontal movement of the vertical milling attachment unit along the overarm horizontally moves the vertical milling attachment therewith;

whereby the vertical milling attachment unit and the vertical milling attachment may be moved independently of one another.

* * * * *